United States Patent
Gröschl (10) Patent No.: US 10,870,156 B2
(45) Date of Patent: Dec. 22, 2020

(54) DEVICE FOR PROCESSING A RIM AND METHOD FOR USING A DEVICE FOR PROCESSING A RIM

(71) Applicant: G+K UMFORMTECHNIK GMBH, Niedernberg/M. (DE)

(72) Inventor: Normen Gröschl, Niedernberg/M. (DE)

(73) Assignee: G+K Umformtechnik GmbH, Niedernberg/M. (DE)

( * ) Notice: Subject to any disclaimer, the term of this patent is extended or adjusted under 35 U.S.C. 154(b) by 87 days.

(21) Appl. No.: 15/328,481

(22) PCT Filed: Jul. 23, 2015

(86) PCT No.: PCT/DE2015/000367
§ 371 (c)(1),
(2) Date: Feb. 20, 2018

(87) PCT Pub. No.: WO2016/015700
PCT Pub. Date: Feb. 4, 2016

(65) Prior Publication Data
US 2019/0143421 A1    May 16, 2019

(30) Foreign Application Priority Data
Jul. 26, 2014 (DE) .......... 10 2014 010 877

(51) Int. Cl.
*B32B 39/00*       (2006.01)
*B32B 41/00*       (2006.01)
(Continued)

(52) U.S. Cl.
CPC .......... *B23B 41/00* (2013.01); *B23B 39/003* (2013.01); *B23B 2215/08* (2013.01); *B23C 2215/085* (2013.01)

(58) Field of Classification Search
CPC ... B23B 39/003; B23B 41/00; B23B 2215/08; B23B 2270/30; B23C 2215/085;
(Continued)

(56) References Cited

U.S. PATENT DOCUMENTS

| 4,490,079 A | * | 12/1984 | Trevarrow | ............. | B21D 53/26 29/894.323 |
| 2011/0068544 A1 | * | 3/2011 | Prust | ................. | B23B 31/16275 279/4.02 |
| 2015/0273588 A1 | * | 10/2015 | Bowen | ..................... | B23B 5/28 82/104 |

FOREIGN PATENT DOCUMENTS

| CN | 202994124 U | * | 6/2013 | | |
| DE | 2302631 A1 | * | 7/1974 | ............. | B32B 41/00 |

(Continued)

OTHER PUBLICATIONS

Machine Translation, German Patent Document, DE 3035505, Karl, B., Apr. 9, 1981. (Year: 1981).*

(Continued)

*Primary Examiner* — Eric A. Gates
*Assistant Examiner* — Chwen-Wei Su
(74) *Attorney, Agent, or Firm* — Michael L. Greenberg, Esq.; Greenberg & Lieberman, LLC (57) ABSTRACT

The invention relates to a device (21) and to a method for processing a rim (1) for a vehicle, in particular an automobile or truck, said device comprising means (2) for supporting the rim, means (3) for centering the rim, and means (4) for drilling, wherein the means for supporting the rim have a protective insert (5), in particular a funnel-shaped element, and can be inserted into an inside (6) of the rim, wherein the rim is arranged on the means for support with the inside in a direction (7) downward and is retained laterally by the means of centering, in particular two means for centering that are arranged opposite, wherein the rim should be (Continued)

oriented with a central wheel hub axis (8) substantially concentric with respect to a processing axis (9) of the means for support, wherein in a wheel hub region (10) the wheel hub region can be drilled into through the means for support from a direction (11) of the inside of the rim by means of the means for drilling.

3 Claims, 11 Drawing Sheets

(51) Int. Cl.
*B23B 41/00* (2006.01)
*B23B 39/00* (2006.01)

(58) Field of Classification Search
CPC .... B23C 2220/40; B23Q 3/062; B23Q 7/005; B23Q 7/18; B23Q 3/186; B26D 7/1818
See application file for complete search history.

(56) References Cited

FOREIGN PATENT DOCUMENTS

| DE | 3035505 A1 | * | 4/1981 | ........... B32B 39/003 |
| GB | 307668 A | * | 3/1929 | ........... B32B 39/003 |

OTHER PUBLICATIONS

Machine Translation, German Patent Document, DE 2302631, Lueders, A. et al., Jul. 25, 1974. (Year: 1974).*
Machine Translation, CN 202994124U, Li et al., Jun. 2013. (Year: 2013).*

* cited by examiner

DEVICE FOR PROCESSING A RIM AND METHOD FOR USING A DEVICE FOR PROCESSING A RIM

The invention deals with a device to process a [wheel] rim according to the generic term from claim 1 and a procedure to use a device to process a [wheel] rim according to the generic term from claim 9.

A device to process a rim is known, in particular aluminium rims where the hub is stamped out. This sometimes leads to tension in the rim.

The function of the invention at hand is to provide a simple, reliable and fast device to process a rim avoiding the drawbacks of the technologies used at present.

The function is solved by a device to process a rim for a vehicle, in particular a passenger car or truck, comprising a device to support the rim, a device to centre the rim, a device to finish the material detail, in particular machining during which the rim is positioned in one direction facing downwards on the support device and sideward to the centring device, in particular two centring devices that are positioned on opposite sides. The rim is positioned with the central wheel hub area mainly concentrically with regard to a processing axis of the support device and/or a predefined processing radius around the processing axis whereby the inner surface of the rim and the device to process the material, in particular machining, are positioned especially so that drilling through the support device into the wheel hub area is possible.

The invention makes it especially possible to remove any sprue residues, also known as pins or taps, around the wheel hub of an aluminium rim accurately and fast. These aluminium rims are produced in low-pressure die casting processes and often contain cavities and so are of lower quality. The residues are removed so that they fall down due to gravity and do not remain lying on the rim. The removal is also possible during the process without having to specially position the rims. The invention eliminates chip problems and malfunctions of the clamping chucks are avoided.

It is advantageous when the device to process the material detail, in particular machining processes, has a device for drilling and/or milling, in particular a milling insert with a diameter that is smaller than that of the material processing of the rim, also using a device for guiding the milling insert in circular or helix-shaped movements.

It is advantageous when the support device has a protective insert, in particular the cone-shaped element, that can be inserted into one inner surface of the rim whereby the protective insert, in particular the cone-shaped element is positioned such that it seals one outer area of the rim to a major extent from material processing chips, in particular drilling chips, entering.

It is advantageous when the guard insert, in particular the cone-shaped element, merely has a through bore to the wheel hub that has a material processing diameter especially a drill diameter and/or milling insert, which is adjusted to perform circular movements.

It is advantageous when the rim is positioned using a device to press the rim down onto the support device.

It is advantageous when the device to press the rim down comprises at least one power element, a powered piston, in particular one or several hydraulic pistons, and/or a disc-shaped element that is positioned on top of the rim and pressed onto the support device.

It is advantageous when the disc-shaped element has cut-outs for the centring device.

It is advantageous when the rim can be transported to the support device using a transport device, in particular transport rollers powered by the centring device.

The function is also solved using a procedure to use a device to process a rim for a vehicle, in particular a passenger car, especially according to the claims 1 to 8, so that the rim is positioned on the support device for the rim with one inner surface facing downward whereby the support device is protected by a cone-shaped element which is inserted into the inner area of the rim and holds it in place in a centred position by means of one or several centring devices. The rim is positioned with a central wheel hub axis that is essentially concentric to the processing axis of the support device and/or a predefined processing radius whereby in one wheel hub area from the direction of the inner surface of the rim, the material is processed, in particular using machining processes, in particular by means of drilling or milling devices, using a milling insert that is fed through the support device into the wheel hub area.

It is advantageous when a device to guide the milling device in circular movements can be lowered vertically so that a helix shape can be formed during the milling process.

It is advantageous when the device for processing the material in the wheel hub area can be moved to be close to and/or on a motion belt moving in particular in a loop and/or a helix shape, or that the rim can be moved in this pattern in relation to the material detail processing device.

It is advantageous when the material processing device, in particular drilling and/or milling machines are only performed until a small part remains on the outer surface of the rim to be removed in a later step, especially when the rest is stamped out using a stamping device and/or a vacuuming device that uses a strong under-pressure.

It is advantageous when the rim is first transported to the support device to be centred using the transport device with the inner surface facing downward, The protective insert especially the cone-shaped element is moved upward into the inner part of the rim and a device to press the rim down, which has a disc-shaped element presses the rim onto the support device and then the material processing device, in particular the machining, the material removal, drilling through a passage in the cone-shaped element through the wheel hub of the rim whereby the protective insert, in particular the cone-shaped element is then moved back into the support device and the processed rim is transported onward.

It is advantageous when the protective insert, the cone-shaped element is pressed tightly onto the inner surface of the rim when being transported so that material that has been removed during machining, especially drilling chips, remain in the inner area of the protective insert.

Further features and advantages of the invention are qualified in the Claims and descriptions below. Here the invention is described in detail in version examples and the respective drawings.

Described are.

Figure 1:
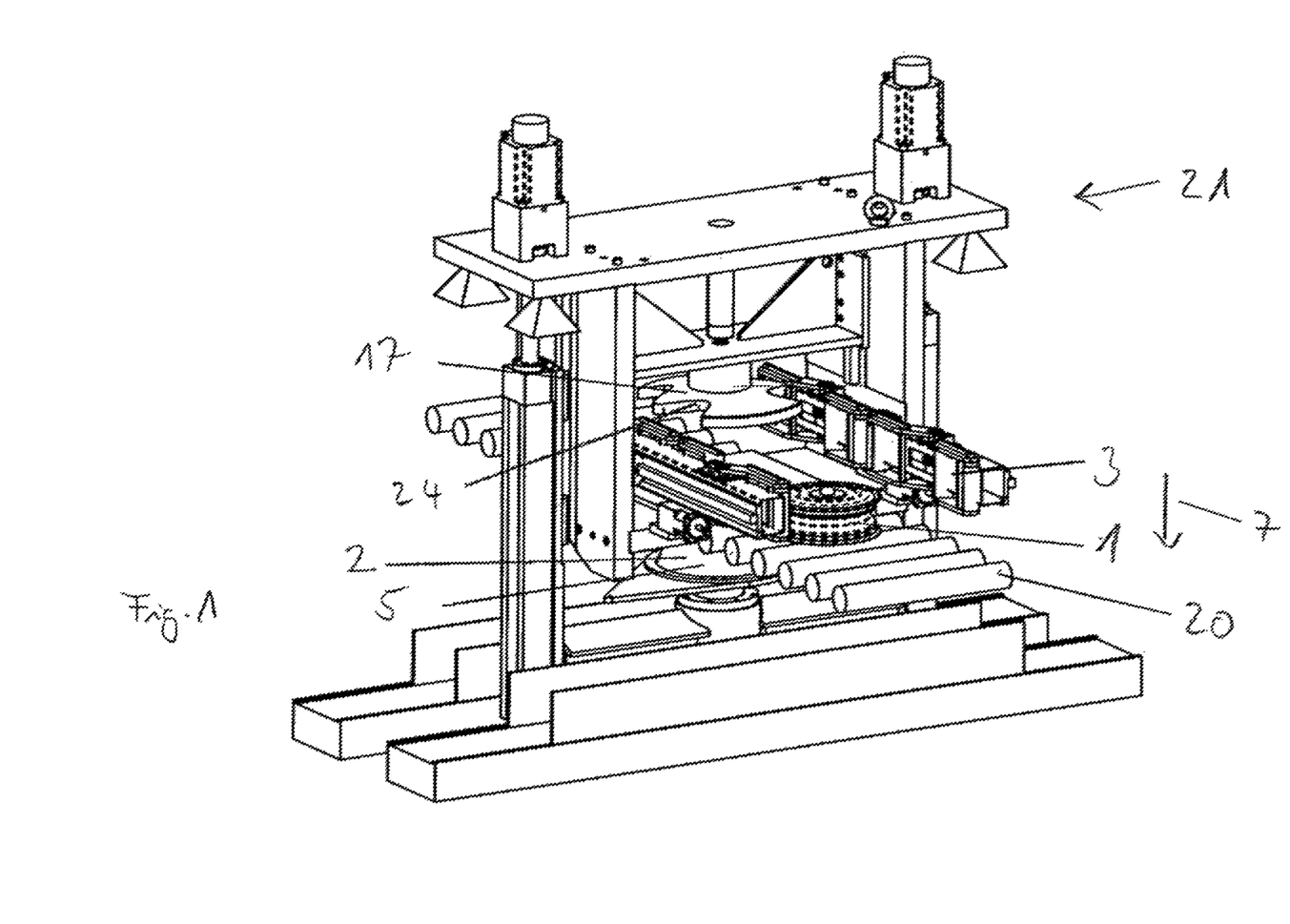
FIG. 1 an invented device to process in perspective view,
FIG. 2 an invented device to process in partial view
FIG. 3 an invented device to process in perspective view
FIG. 4 an invented device to process in sectional view
FIG. 5 an invented device to process in sectional view
FIG. 6 a section of an invented device to process in sectional view
FIG. 7 an invented device to process in sectional view
FIG. 8 an invented device to process in sectional view
FIG. 9 an invented device to process in sectional view FIG. 10 an invented device to process in sectional view and FIG. 11 an invented device to process in schematic view.

FIG. 1 an invented device 21 to process in perspective view. The device 21 is invented to process a rim 1 for a vehicle, in particular a passenger car. A rim 1 is delivered to a support device 2 in the centre of the device 21 using a transport system 19 with example transport rollers 20. The device 21 comprises as an example the support device 2 of the rim, a centring device 3 and a drilling device that is out of view. A device to press the rim down 17 what is positioned in the rim has a disc-shaped element 18 with cut-outs 24 for the centring device 3. The support device 2 of the rim has a cone-shaped element that can be inserted into the inner part of the rims shown in FIG. 4 as an example. The rim 1 is positioned in one direction 7 facing downward on the support device 2 and sideward from the two centring devices 3 that are positioned on opposite sides, as shown in FIG. 2.

Figure 2:
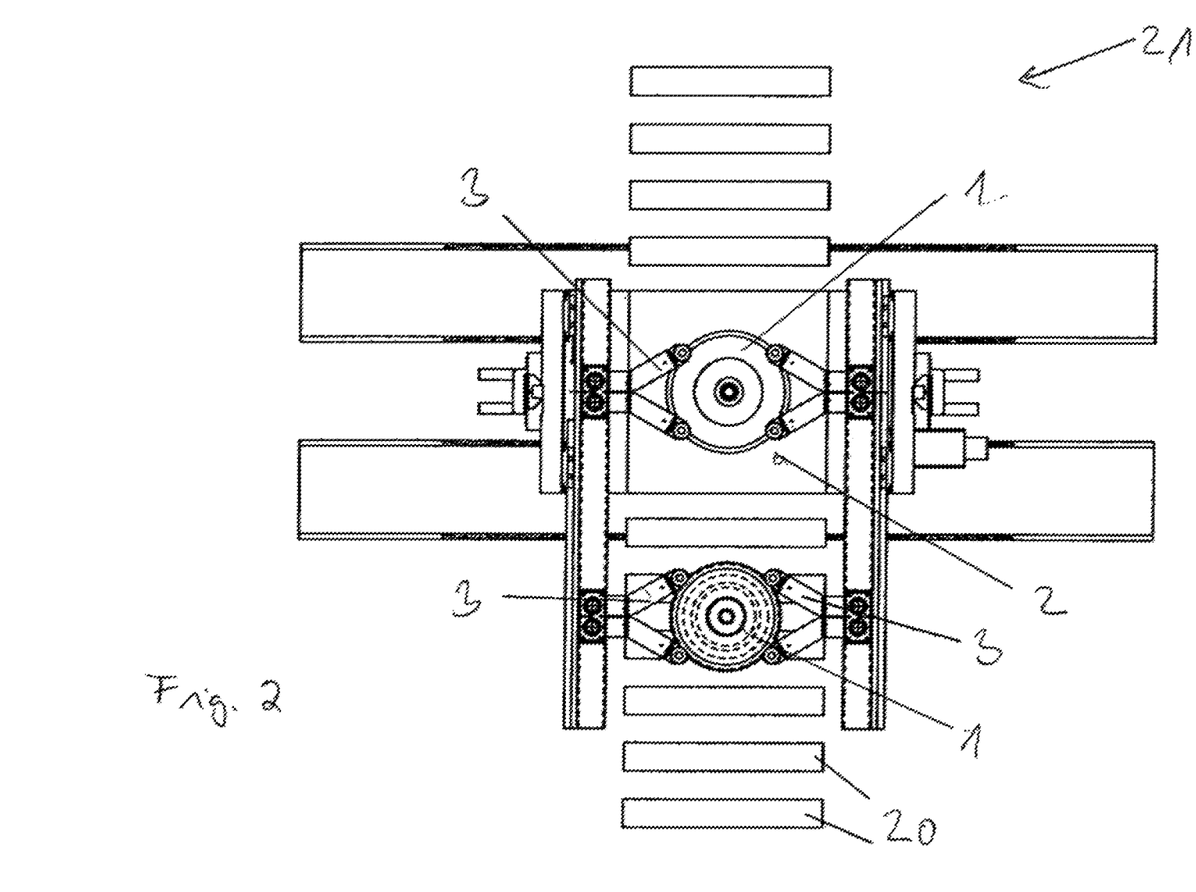

FIG. 2 is an invented device to process 21 in partial view. The transport device 19 with transport rollers 20 moves two rims 1 one after the other to the support device 2 and are held in a centred position by the device 3. The transport system 19 can also be used as a centring device to position the rim 1 in a centred position. As soon as a rim has been processed it is grabbed and transported onward on the transport system using the centring device after this has grabbed a new rim.

Figure 3:
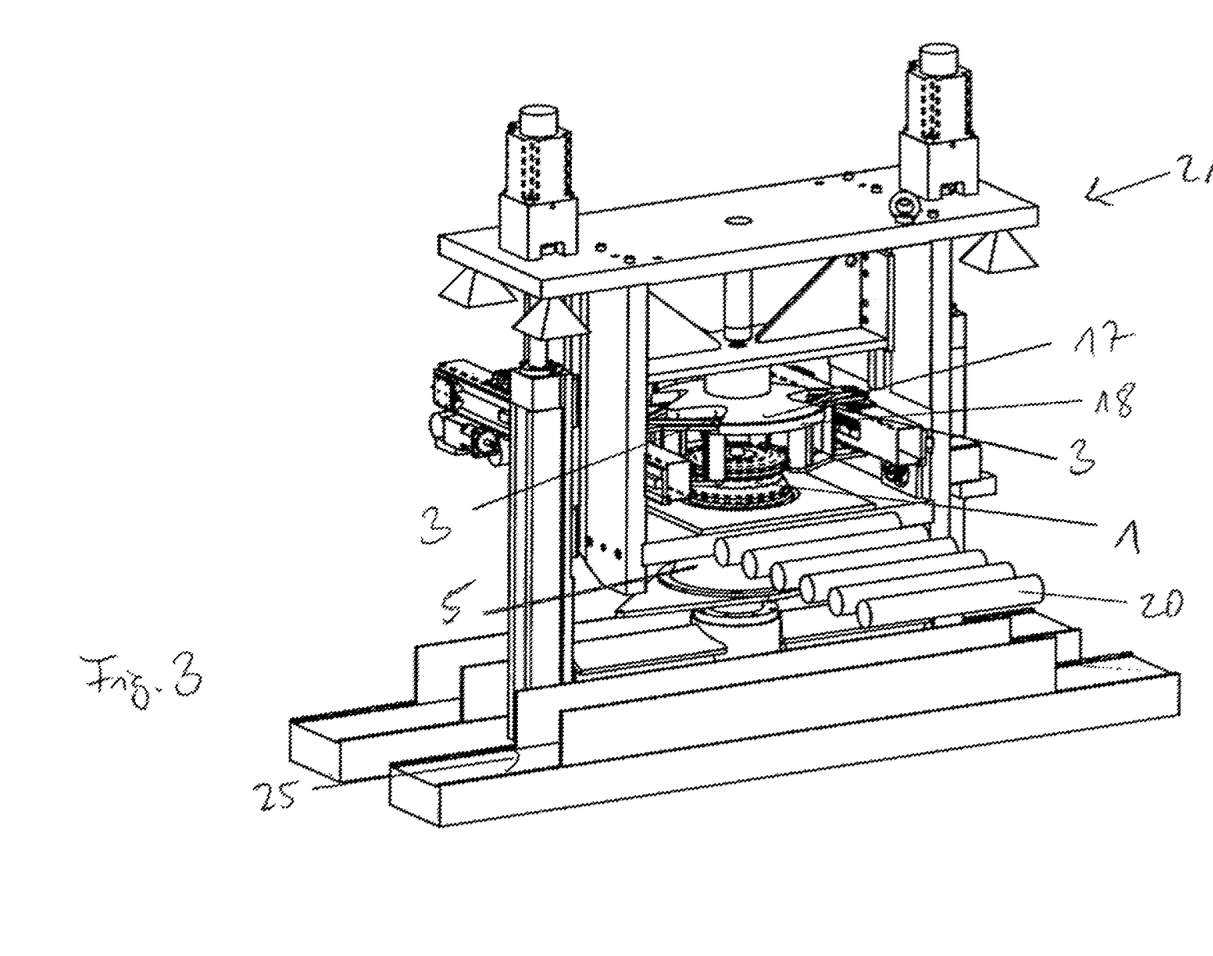

FIG. 3 is an invented device to process 21 in perspective view. A disc-shaped element 18 of a device to press the rim downward 17 with cut-outs 24 lowers itself vertically onto the rim 1. The rim is lying on the support device and delivered by the transport rollers 20. A cone-shaped element 5 is inserted from below. Later the drilling chips can be collected in a drilling chip collector 25.

Figure 4:
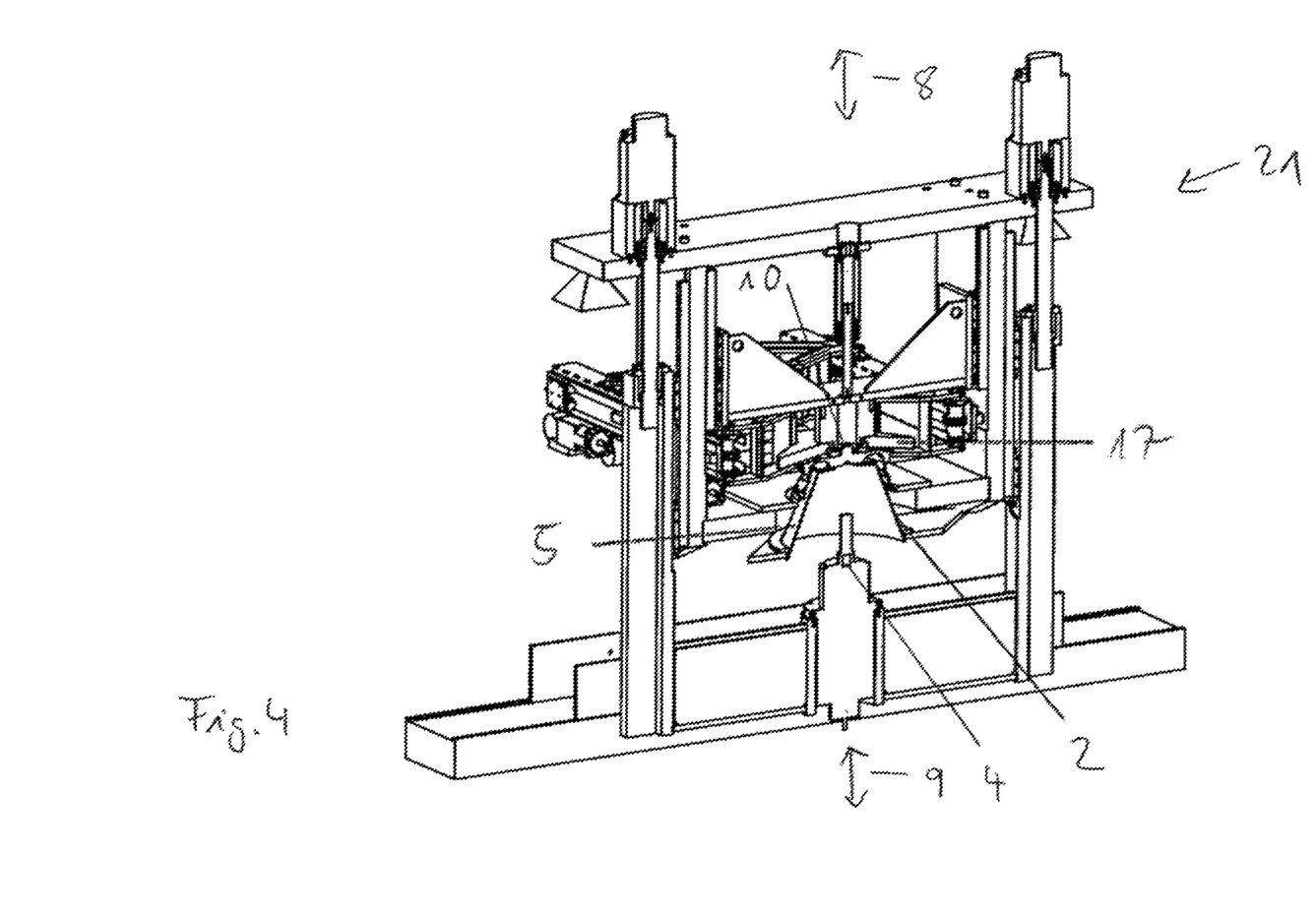

FIG. 4 is an invented device to process 21 in sectional view.

The rim 2 is positioned concentrically to the processing axis 9 in a central wheel hub shaft 8. The rim is held in place using a press-down device 17.

In a wheel hub area 10 a hole can be drilled through the cone-shaped element 5 of the support device 2 which can be inserted into the wheel hub area 10 from one direction 11 of the inner surface of the rim 2 with the drilling device 4.

Figure 5:
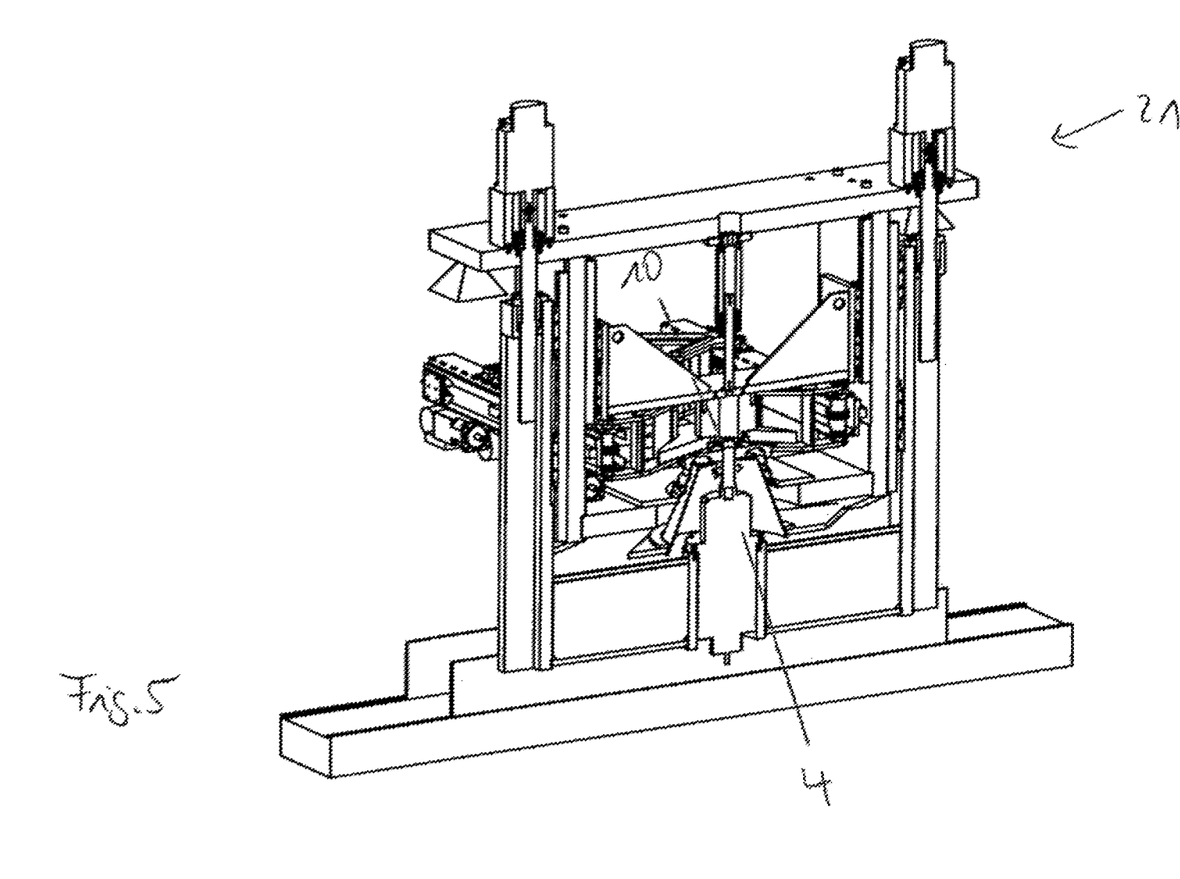

FIG. 5 is an invented device to process 21 in sectional view. The drilling device 4 is drilled through to the wheel hub area 10.

Figure 6:
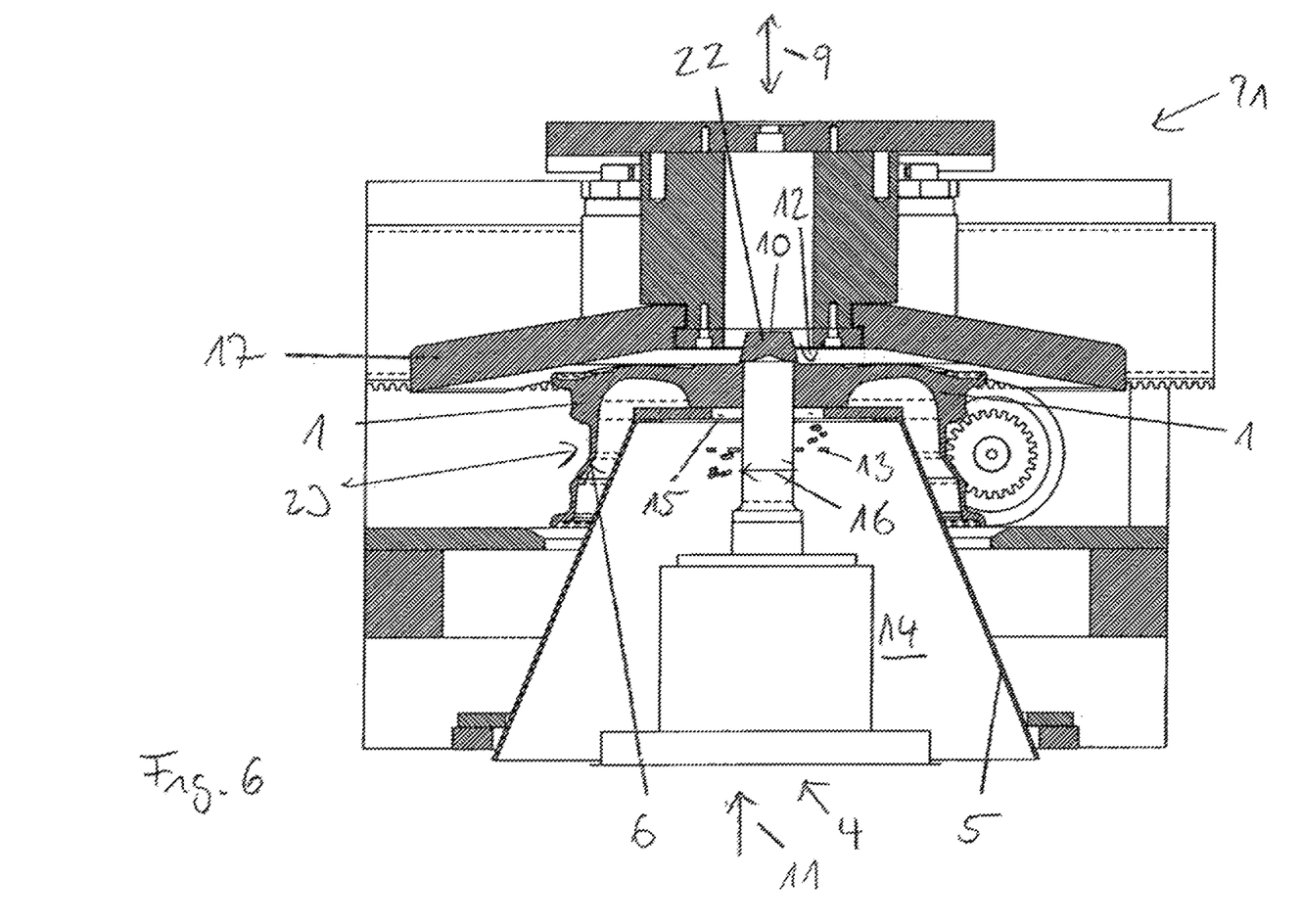

FIG. 6 a section of an invented device 2 to process in sectional view. The cone-shaped element 5 must be positioned, at least while drilling, so that it can be fed through the cone-shaped element 5 into the wheel hub area 10 with one drilling action from one direction 11 of the inner surface 6 of the rim 1 with the drilling device 4. The cone-shaped element 5 prevents drilling chips 13 from falling onto or into the rim and retains them in an outer area 12. The drilling chips 13 fall into the inner area 14 of the rim 1. The cone-shaped element only has a passage 15 to the wheel hub area 10 that is adapted to fit the drill diameter 16. The rim 2 is held in place on the cone-shaped element 5 mainly using the press-down device 17 of the rim. The part 22 remaining after drilling can be removed in the stamping process that occurs afterwards.

Figure 7:
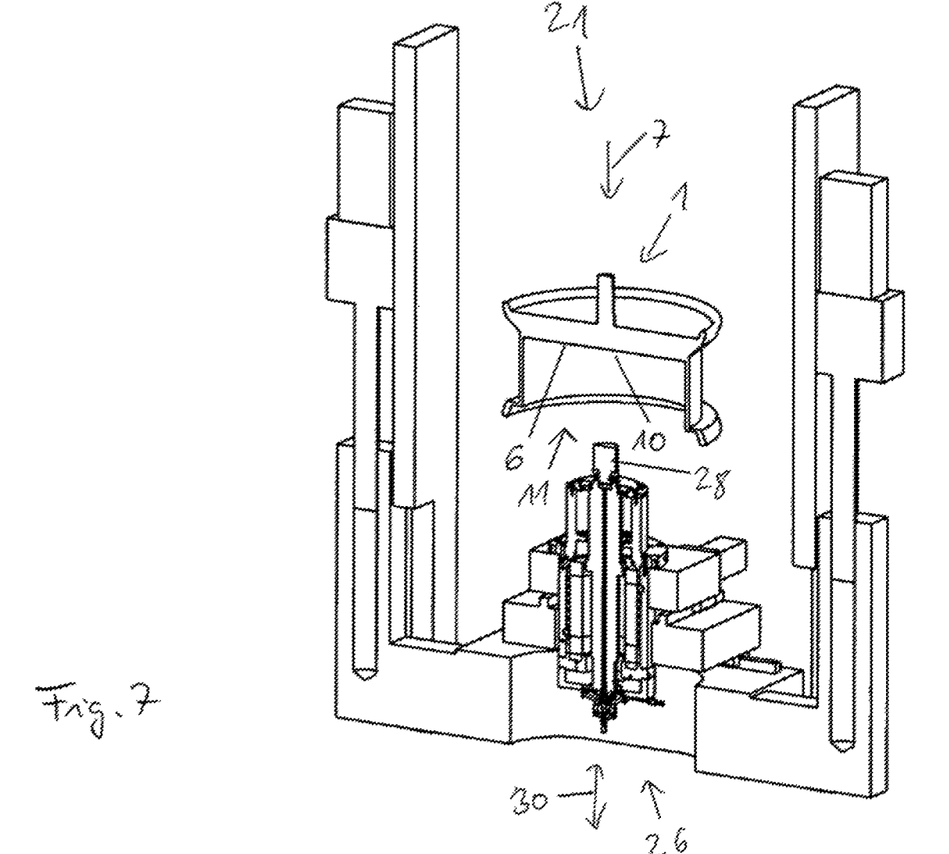

FIG. 7 shows an invented device 21 to process a rim 1 in sectional view, where the material detail processing device 26 in particular machining, in this case a milling process in combination with a circular motion and/or a helix-shaped process motion of a milling device.

The material detail processing device 26 is positioned in a central area of the rim. The device 21 to process the rim 1 comprises a material detail processing device 26 in particular for machining where the rim 2 is held with the inner surface 6 in the direction 7 facing downward and the rim 2 is held mainly concentrically on a central wheel hub shaft 8 to a central axis 30 of a circular movement and/or helix-shaped movement whereby in a wheel hub area 10 from one direction 11 of the inner surface 6 of the rim 1 with the material detail processing device 26, in particular a milling insert 28, can be inserted through the support device into the rim hub area 10.

Figure 8:
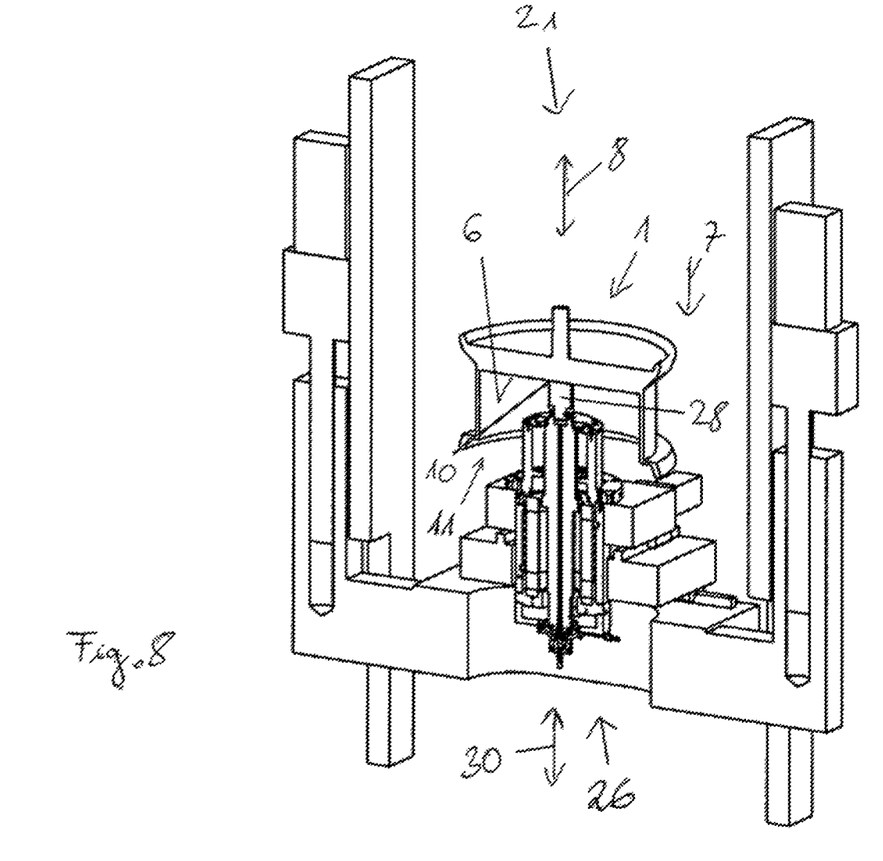

FIG. 8 shown an invented device 21 to process in sectional view with a material detail processing device 26, with a milling insert 28 in a sideward circular position whereby the milling insert can be used with approx. 12,000 revolutions.

Figure 9:
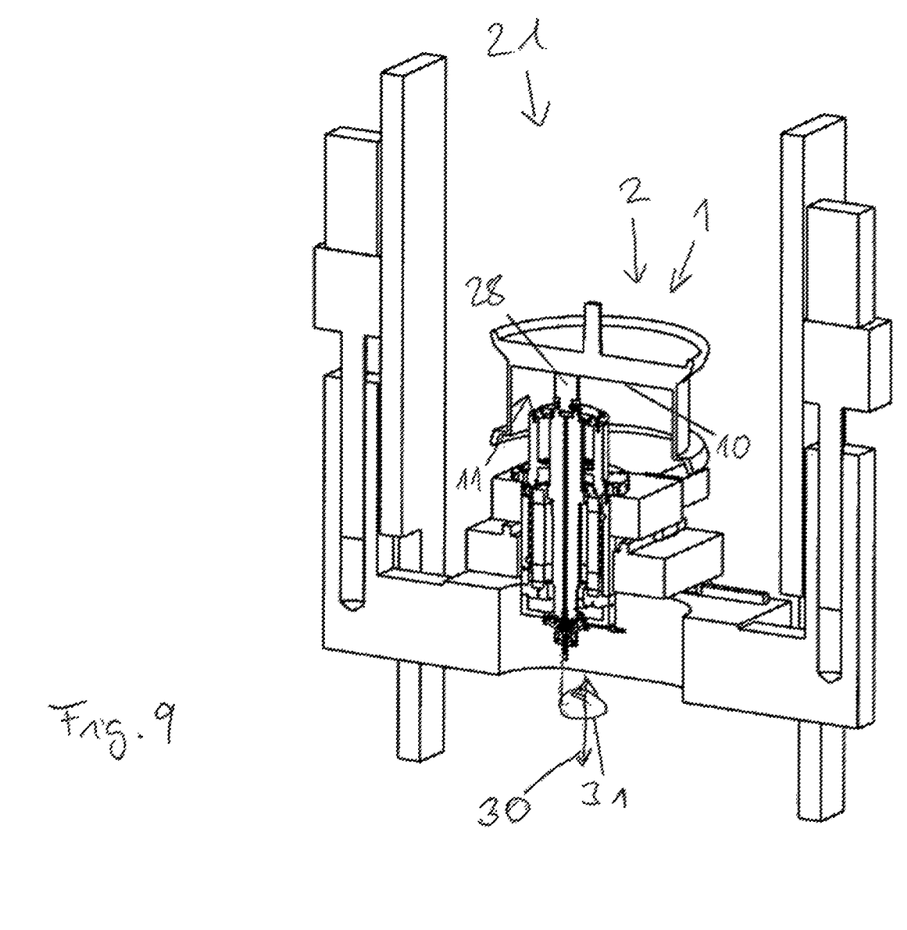

FIG. 9 shown an invented device 21 to process in sectional view with a material detail processing device 26, with a milling insert 28 in a sideward position on a circular motion line 31. The advantage of the device here is that it can be used with different diameters 32 of the material detail processing in the rim. The smallest possible diameter is selected as the milling device in order to produce larger inner rim holes using circular, perhaps CNC controlled milling devices. A controlled cross table, a circular table or another suitable system effects a motion that is horizontal to the drilling spindle in the x-axis and y-axis. The z-axis determined the milling depth/drilling depth in the rim. The same effect of the circular milling process could also be produced by moving the rim accordingly.

Figure 10:
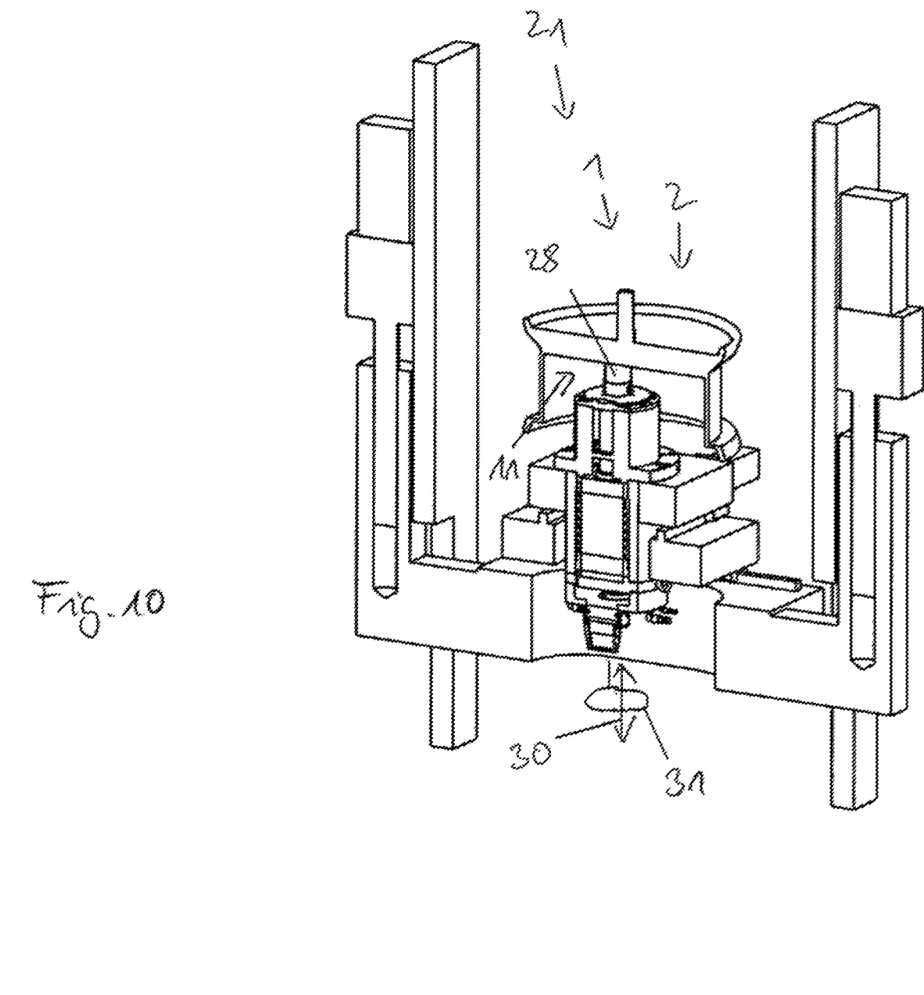

FIG. 10 shows an invented device 21 with a milling insert 28 to process in sectional view.

Figure 11:
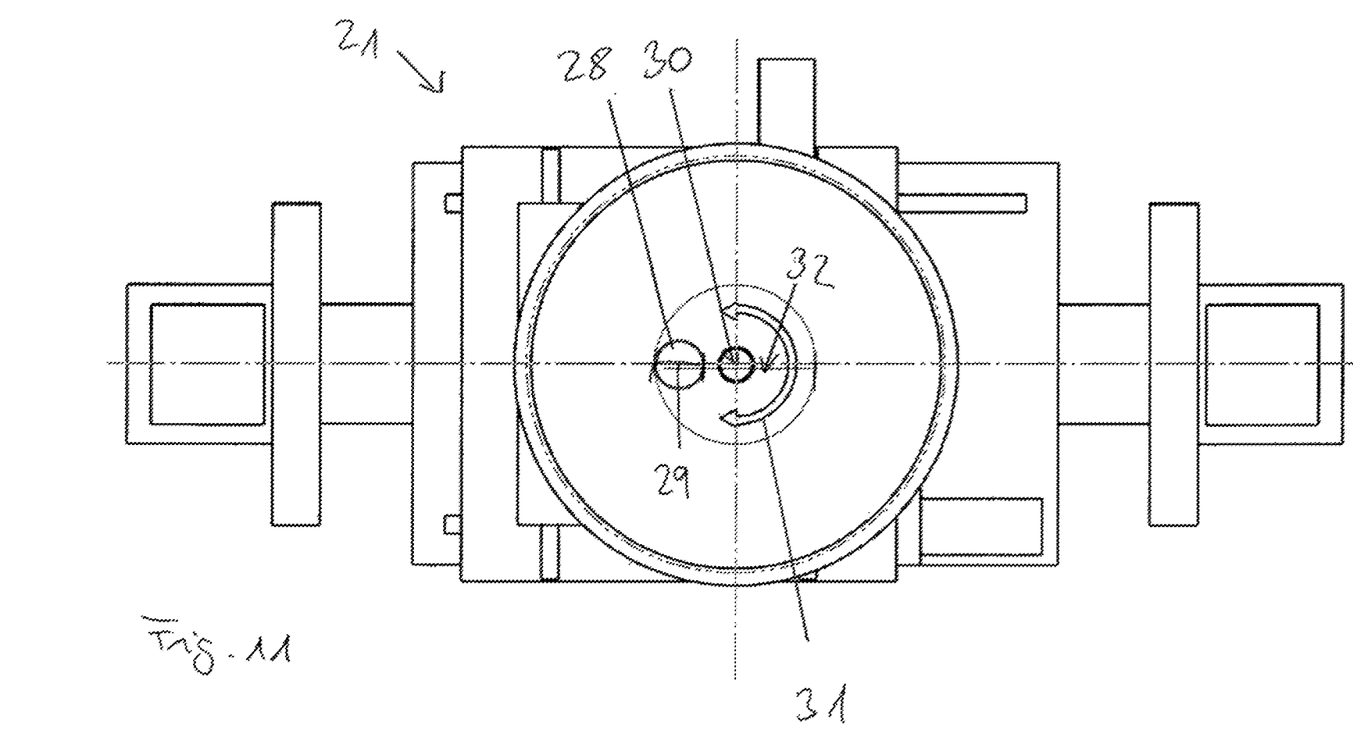

FIG. 11 shows an invented processing device 21 in schematic view.

LIST OF REFERENCES

1 Rim
2 Support device
3 Centring device
4 Drilling device
5 Cone-shaped element
6 Inner surface
7 Direction
8 Central wheel hub shaft
9 Processing axis
10 Wheel hub area
11 Direction
12 Outer surface
13 Drilling chips
14 Inner surface
15 Passage
16 Drill diameter
17 Depressing device
18 Disc-shaped element
19 Transport device
20 Transport roll
21 Processing device
22 Other
23 Outer surface
24 Cut-out
25 Drilling chip collector
26 Material detail finish
27 Milling device
28 Milling insert
29 Diameter 30 Central axis
31 Circular motion line
32 Diameter

The invention claimed is:

1. A device to process a rim (1) for a vehicle, comprising:
a means to support (2) the rim;
a means to center the rim;
a means to handle material including chipping produced via machining of the rim to the inner side (6) in a direction (7) located down on the means to support (2) the rim at a first side of the means to center the rim and a second side of the means to center the rim, such that the rim is held and centered between the first side of the means to center the rim and the second side of the means to center the rim;
wherein the rim (2), to align with a central hub axle (8), is substantially concentric with respect to a machining axis (9) of the means to support (2) the rim and/or a predetermined machining radius about the machining axis (9) is, in a hub portion (10), in one direction (1 1) of the inner side (6) of the rim (1) with the means to handle material including machining (4) a material preparation, via drilling hole by the means for support (2) into the wheel hub portion (10) is feasible;
wherein the means to support (2) the rim has a funnel-shaped element (5) as a protective insert, and is insertable into an inner surface (6) of the rim;
wherein the funnel-shaped element (5) is arranged in such a way that the funnel-shaped element provides for a seal of an outer area (12) of the rim against loosing of processed material swarfs (13); and
wherein the device is characterized in that a plate-shaped element (18) provides recesses (24) for the means to center the rim.

2. A method of using an apparatus for processing (21) of a rim (1) for a vehicle according to claim 1, characterized in that the means for supporting (2) the rim has an inner surface (6) disposed in a direction (7) which is laid down;
wherein the means for support (2) has a protective insert;
wherein said protective insert is a funnel-shaped element (5), which, in an inner region (14), the rim is introduced;
wherein the rim is inserted through one or more means for centering (3) of the rim in a centering position and is held, in conjunction with one central hub axle (8), is substantially concentric with respect to a machining axis (9) of the means for support (2) and/or a predetermined machining radius is aligned with the inner side (6) of the rim, in a hub area (10) with a means handling material, including machining (4);
a material processing is possible via drilling carried out by a means for drilling (4) and/or a trepan means (27), via use of a milling insert (28) by the means for support (2) into the hub area (10); and
wherein the method is characterized in that the means to handle material (26) for processing in the wheel hub portion (10) is to be moved, to approach and/or on a moving web, on a circular path line (31) and/or helical path with a trepan means (27) to guide and move the rim (1) relative to the means to handle material.

3. A method of using an apparatus for processing (21) of a rim (1) for a vehicle according to claim 1, characterized in that the means for supporting (2) the rim has an inner surface (6) disposed in a direction (7) which is laid down;
wherein the means for support (2) has a protective insert;
wherein said protective insert is a funnel-shaped element (5), which, in an inner region (14), the rim is introduced;
wherein the rim is inserted through one or more means for centering (3) of the rim in a centering position and is held, in conjunction with one central hub axle (8), is substantially concentric with respect to a machining axis (9) of the means for support (2) and/or a predetermined machining radius is aligned with the inner side (6) of the rim, in a hub area (10) with a means handling material, including machining (4);
a material processing is possible via drilling carried out by a means for drilling (4) and/or a trepan means (27), via use of a milling insert (28) by the means for support (2) into the hub area (10); and
characterized in that the material preparation, including machining, drilling, and/or milling, is only so far carried out, such that the machining is drawn up a small residual (22) of, a drilled out hub region (10) in the direction of an outer side (23) of rim, and then a separate distance of the residual (22), including machining punched-out of the residual of the rim by means of punching and/or a suction means via a strong negative pressure.

* * * * *